Jan. 28, 1941.  G. M. OWENS  2,230,010
NONSLIDE RULER AND INSTRUMENT
Filed Feb. 1, 1940
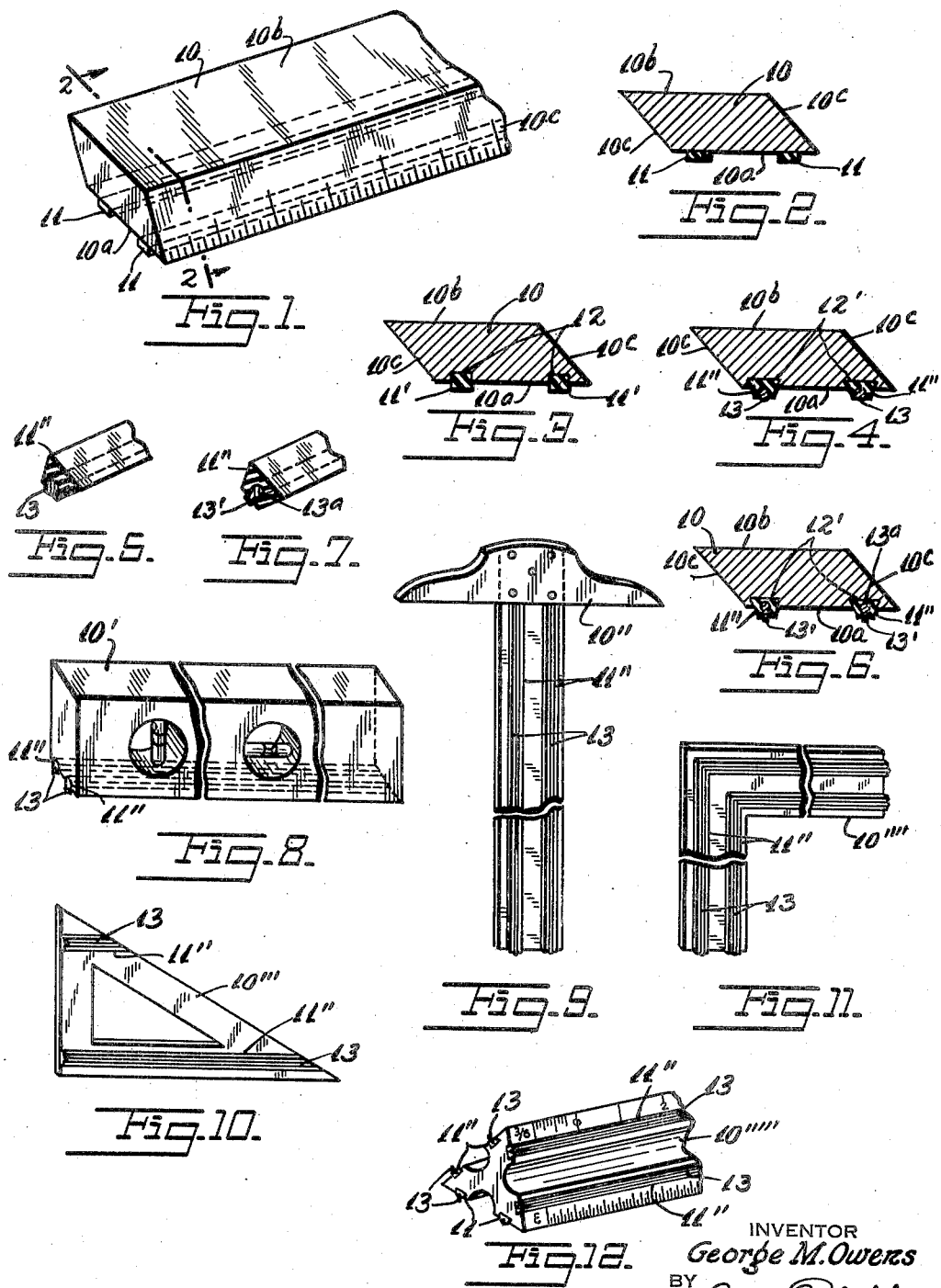
INVENTOR
George M. Owens
BY
ATTORNEY Patented Jan. 28, 1941

2,230,010

UNITED STATES PATENT OFFICE 2,230,010

NONSLIDE RULER AND INSTRUMENT

George M. Owens, Casper, Wyo.

Application February 1, 1940, Serial No. 316,767

7 Claims. (Cl. 33—107)

This invention relates to new and useful improvements in a nonslide ruler, drawing and other instruments.

More specifically, the invention proposes that an instrument proper having a face adapted to rest upon a flat surface be provided with a plurality of friction strips in a manner to engage the flat surface to prevent the same from sliding thereon.

Still further the invention proposes that the friction strips be attached to any instrument adapted to be used as a straight edge for drawing lines or to any other instrument which is adapted to be held against sliding upon a flat surface.

A further object of this invention proposes that the instrument proper be in the form of a ruler, carpenter's level, carpenter's square, a T-square, drawing angles or French curves, a drawing scale, a "Ritz" ruler, or any other similar instrument.

Still further the invention proposes that the friction strips be pasted to the face of the instrument proper or set into receiving grooves formed in the face of the instrument, as desired.

A further object of this invention is the provision of nonfriction elements mounted on said strips in a manner to engage said flat surface to permit said instrument to slide across said flat surface when desired.

Still further the invention proposes that the nonfriction elements be substantially less in width than the width of the friction elements so that when pressure is applied to the top faces of the instrument the nonfriction elements will be embedded in the friction elements to permit the edges thereof to contact the flat surface and hold the instrument against sliding when desired.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a partial perspective view of a ruler constructed in accordance with this invention.

Fig. 2 is a sectional view taken on the line 2—2 of Fig. 1.

Fig. 3 is a view similar to Fig. 2 but illustrating a modification of the invention.

Fig. 4 is an enlarged view similar to Fig. 2 illustrating a further modification of the invention.

Fig. 5 is a partial sectional perspective view of a portion of the nonslide attachment used in conjunction with the modification of the invention shown in Fig. 4.

Fig. 6 is an enlarged sectional view similar to Fig. 2, but illustrating a still further modification of the invention.

Fig. 7 is an enlarged sectional perspective view of a portion of the nonslide attachment used in conjunction with the modification of the invention shown in Fig. 6.

Fig. 8 is a perspective view of a carpenter's or similar level constructed in accordance with the modification shown in Fig. 4.

Fig. 9 is a perspective view of a T-square constructed in accordance with the modification shown in Fig. 4.

Fig. 10 is a perspective view of a drawing angle constructed according to the modification shown in Fig. 4.

Fig. 11 is a perspective view of a carpenter's or similar square constructed in accordance with the modification shown in Fig. 4.

Fig. 12 is a partial perspective view of a drawing scale constructed in accordance with the modification shown in Fig. 4.

The nonslide ruler, drawing, or other instrument, according to this invention, includes an instrument proper 10 having a face 10$^a$ adapted to rest upon a flat surface and a top face 10$^b$. In this form of the invention the instrument proper is in the form of a ruler having two beveled edges 10$^c$ which may be calibrated for inches, centimeters, or a "Ritz" ruler, or any other desired calibration for use in measuring distances. This form of the invention may be rested upon either of its faces 10$^a$ or 10$^b$, permitting the portion of the inclined edges laying immediately adjacent this flat surface to be used as a straight edge for drawing lines.

A plurality of friction strips 11 are mounted upon the face 10$^a$ and are adapted to engage the flat surface for preventing the instrument proper from slipping when a pencil or similar instrument is moved along the edge thereof for drawing a straight line. These friction strips are constructed of rubber and are securely cemented, pasted, or in any other similar manner attached to the face 10$^a$ of the instrument proper 10.

The manner in which this form of the invention is used is as follows: The instrument proper is rested upon a flat surface with its friction strips engaging the face of the flat surface. One hand is placed on the instrument proper 10 and the pencil to be used for drawing the straight line is taken in the other hand. Pressure is applied to the instrument body by pressing thereon with the hand resting upon the face 10ᵇ thereof to cause the friction strips 11 to frictionally bear against the flat surface and maintain the instrument body in position. The pencil or other instrument is then moved along the edge of the instrument proper for drawing the straight line.

According to the modification of the invention shown in Fig. 3 the construction of the nonslide ruler is similar to that previously described, except that the face 10ᵃ of the instrument body 10 is provided with a pair of spaced grooves 12 into which the friction strips 11' are set. In other respects this form of the invention is similar to the previous form and similar parts may be identified by like reference numerals.

According to the modification shown in Figs. 4 and 5 the construction of the nonslide ruler is similar to that previously described except that the friction elements 11" are trapezoidal in shape and are set into corresponding receiving grooves 12' formed in the face 10ᵃ of the instrument proper 10.

These friction strips 11" are further provided with nonfriction elements mounted thereon and which are adapted to engage the flat surface, and being depressible for causing the edges of the friction strips to engage the flat surface when desired. These nonfriction elements are in the form of longitudinal metallic wires 13 set into the free face of the friction strips 11" with a portion thereof projecting beyond the bottom face of the friction strips. Normally, the instrument proper rests upon the nonfriction elements 13 which permit the instrument proper to be easily moved across the flat surface when desired. When it is advantageous to hold the instrument proper against sliding it is merely necessary to apply pressure to the top face thereof which will cause the nonfriction elements to become embedded into the friction strips which are constructed of resilient material, causing the edges thereof to frictionally bear against the flat surface and hold the instrument against moving.

According to the modification of the invention shown in Figs. 6 and 7 the nonslide ruler is similar to that described in connection with Figs. 4 and 5, except for a slightly differently shaped nonfriction element 13' which is set into the friction strips 11". In this form of the invention the nonfriction elements 13' are in the form of metallic strips having beads 13ᵃ formed along the top edge thereof and which are embedded in the rubber of the friction strips 11" for locking the same in position therein. In other respects this form of the invention is similar to the previous forms.

In Figs. 8 to 12 inclusive the instrument proper takes different forms and consists of a carpenter's or similar level 10', a T-square 10", a drawing angle 10''', a carpenter's or similar square 10'''', and a drawing scale 10'''''. Each of these instruments is provided with the modification of the invention shown in Figs. 4 and 5 in which the friction strips are provided with nonfriction elements for permitting the instruments to be moved across the flat surface when desired.

While I have shown certain specific applications of this invention, I wish to point out that this application is not limited to these specific articles and the same may easily be applied to any other instrument adapted to be used as a straight edge, or any instrument which is adapted to be retained against sliding on any flat surface to which it might be applied.

Having thus described my invention, what I claim as new, and desire to secure by United States Letters Patent is.

1. A nonslide ruler, drawing and other instrument, comprising an instrument proper having a face adapted to rest on a flat surface, a plurality of friction strips of compressible material mounted on said face and adapted to engage said flat surface, and nonfriction elements mounted on said strips to engage said flat surface and depressible so that said friction strips engage said flat surface.

2. A nonslide ruler, drawing and other instrument, comprising an instrument proper having a face adapted to rest on a flat surface, a plurality of friction strips of compressible material mounted on said face and adapted to engage said flat surface, and nonfriction elements mounted on said strips to engage said flat surface and depressible so that said friction strips engage said flat surface, said nonfriction elements being in the form of metallic wires extending along the length of said friction strips and set into the bottom face thereof with a portion of the wire projecting beyond the bottom face of said friction strips.

3. A nonslide ruler, drawing and other instrument, comprising an instrument proper having a face adapted to rest on a flat surface, a plurality of friction strips of compressible material mounted on said face and adapted to engage said flat surface, and non-friction elements mounted on said strips to engage said flat surface and depressible so that said friction strips engage said flat surface, said nonfriction elements being in the form of metallic wires extending along the length of said friction strips and set into the bottom face thereof with a portion of the wire projecting beyond the bottom face of said friction strips, said nonfriction elements being substantially less in width than said friction strips for permitting the edges of said friction strips to engage said flat surface when pressure is applied to the face of said instrument causing said nonfriction elements to become embedded in said friction strips.

4. A nonslide ruler, drawing and other instrument, comprising an instrument proper having a face adapted to rest on a flat surface, a plurality of friction strips of compressible material mounted on said face and adapted to engage said flat surface, and nonfriction elements mounted on said strips to engage said flat surface and depressible so that said friction strips engage said flat surface, said nonfriction elements being in the form of metallic wires extending along the length of said friction strips and set into the bottom face thereof with a portion of the wire projecting beyond the bottom face of said friction strips, said nonfriction elements being in the form of metallic strips having beads formed along their top edges and extended into said friction strips.

5. A nonslide ruler, drawing or other instrument, comprising an instrument proper having a face adapted to rest on a flat surface and a pair of spaced grooves formed in said face, friction strips of resilient rubber mounted in said grooves and projected beyond the said face, and nonfriction elements mounted in the projected face of said friction strips and engaging said flat surface providing a surface for facilitating the movement of said instrument across said flat surface.

6. A nonslide ruler, drawing or other instrument, comprising an instrument proper having a face adapted to rest on a flat surface and a pair spaced grooves formed in said face, friction strips of resilient rubber mounted in said grooves and projected beyond the said face, and nonfriction elements mounted in the projected face of said friction strips and engaging said flat surface providing a surface for facilitating the movement of said instrument across said flat surface, said instrument being adapted to be urged towards said flat surface causing said nonfriction elements to become embedded in said friction strips causing the edges of said friction strips to be extended beyond the face of said nonfriction elements to frictionally engage said flat surface and prevent the movement of said instrument.

7. A nonslide ruler, drawing or other instrument, comprising an instrument proper having a face adapted to rest on a flat surface and a pair of spaced grooves formed in said face, friction strips of resilient rubber mounted in said grooves and projected beyond the said face, and nonfriction elements mounted in the projected face of said friction strips and engaging said flat surface providing a surface for facilitating the movement of said instrument across said flat surface, said nonfriction elements, comprising lengths of wire having a circular cross-section with more than half of their exposed surfaces embedded in said friction strips.

GEORGE M. OWENS.